(12) United States Patent
Hall et al.

(10) Patent No.: US 11,370,144 B2
(45) Date of Patent: Jun. 28, 2022

(54) METHOD AND SYSTEM FOR SEQUENCING VENEER TO LUMBERCORE

(71) Applicant: GOODRICH CORPORATION, Charlotte, NC (US)

(72) Inventors: Benjamin D. Hall, Carmel, IN (US); Charles A. Knauer, Borden, IN (US); Christopher L. Chapman, Georgetown, IN (US); John R. White, New Albany, IN (US); Brian K. Barnett, New Albany, IN (US); Freddy R. Copelin, Lanesville, IN (US); Tim L. Funk, Austin, IN (US)

(73) Assignee: Goodrich Corporation, Charlotte, ND (US)

( * ) Notice: Subject to any disclaimer, the term of this patent is extended or adjusted under 35 U.S.C. 154(b) by 118 days.

(21) Appl. No.: 16/596,493

(22) Filed: Oct. 8, 2019

(65) Prior Publication Data

US 2021/0101306 A1    Apr. 8, 2021

(51) Int. Cl.
*B27D 1/06* (2006.01)
*B32B 7/12* (2006.01)
(Continued)

(52) U.S. Cl.
CPC .................. *B27D 1/06* (2013.01); *B27D 1/00* (2013.01); *B27D 1/04* (2013.01); *B27L 5/00* (2013.01);
(Continued)

(58) Field of Classification Search
CPC ... B27D 1/00; B27D 1/04; B27D 1/06; B27D 1/10; B27D 1/08; B27L 5/00; B27M 1/08
See application file for complete search history.

(56) References Cited

U.S. PATENT DOCUMENTS 3,935,341 A * 1/1976 Sorensen ............. B27K 3/0214
427/317
4,465,539 A 8/1984 Saihara et al.
(Continued)

FOREIGN PATENT DOCUMENTS

AT          529247 T      11/2011
CA         2041804 A1     12/1991
(Continued)

OTHER PUBLICATIONS

Repair Furniture Surfaces: Veneer, Jul. 24, 2010 (Year: 2010).*
(Continued)

*Primary Examiner* — Matthew Katcoff
(74) *Attorney, Agent, or Firm* — Suiter Swantz pc llo

(57) ABSTRACT

A method for sequencing veneer to lumbercore includes receiving a veneer grain width input and a veneer thickness input, determining a cut angle based on the veneer grain width input and the veneer thickness input, receiving a lumbercore width input and a lumbercore height input, determining a set of dimensions for a stack of lumber, and generating a template mapping the lumbercore to the stack of lumber, where the template is based on the lumbercore width input, the lumbercore height input, and the set of dimensions for the stack of lumber, where the lumbercore is rotated within the template at an angle relative to horizontal within the stack of lumber by an amount equal to the cut angle.

12 Claims, 11 Drawing Sheets

(51) Int. Cl.
  *B32B 21/13* (2006.01)
  *B32B 21/14* (2006.01)
  *B27D 1/00* (2006.01)
  *B27L 5/00* (2006.01)
  *B27D 1/04* (2006.01)
  *B32B 37/12* (2006.01)

(52) U.S. Cl.
  CPC ............... *B32B 7/12* (2013.01); *B32B 21/13* (2013.01); *B32B 21/14* (2013.01); *B32B 37/12* (2013.01)

(56) References Cited

U.S. PATENT DOCUMENTS

| | | | |
|---|---|---|---|
| 4,543,284 A * | 9/1985 | Baum | B32B 21/13 428/106 |
| 5,255,726 A * | 10/1993 | Hasegawa | B27L 5/02 144/365 |
| 5,897,735 A | 4/1999 | Peskin | |
| 6,428,871 B1 * | 8/2002 | Cozzolino | E04F 15/02 428/44 |
| 6,854,498 B2 | 2/2005 | Nemchick et al. | |
| 7,437,278 B2 * | 10/2008 | Suzuki | B27B 1/007 250/559.45 |
| 8,401,718 B2 | 3/2013 | Rashid et al. | |
| 8,414,996 B2 * | 4/2013 | Senior | B32B 21/14 428/106 |
| 8,668,857 B1 | 3/2014 | Karem | |
| 9,243,151 B2 | 1/2016 | Schmitz | |
| 9,878,771 B2 | 1/2018 | Chapman et al. | |
| 10,220,934 B2 | 3/2019 | Reddy et al. | |
| 10,603,812 B2 * | 3/2020 | Rastogi | B32B 7/12 |
| 11,000,967 B2 * | 5/2021 | Stopfer | B27D 1/08 |
| 2006/0035053 A1 * | 2/2006 | Eichinger | A47G 9/0207 428/74 |
| 2012/0067508 A1 | 3/2012 | Booth et al. | |
| 2012/0076992 A1 | 3/2012 | Harris | |
| 2014/0370231 A1 * | 12/2014 | Wallace | B32B 21/14 156/182 |
| 2018/0057139 A1 | 3/2018 | Reddy et al. | |

FOREIGN PATENT DOCUMENTS

| | | |
|---|---|---|
| CN | 102431065 A | 5/2012 |
| CN | 207292365 U | 5/2018 |
| CN | 207327360 U | 5/2018 |
| CN | 207425347 U | 5/2018 |
| EP | 0342413 B1 | 3/1997 |
| EP | 1108753 A3 | 5/2002 |
| EP | 1871579 B1 | 6/2011 |
| EP | 0933256 B2 | 9/2011 |
| EP | 1800860 B2 | 6/2016 |
| EP | 3168040 A1 | 5/2017 |
| GB | 342695 A | 2/1931 |
| GB | 576418 A | 4/1946 |
| GB | 741480 A | 12/1955 |
| GB | 773929 A | 5/1957 |
| GB | 1391077 A | 4/1975 |
| GB | 1531481 A | 11/1978 |
| GB | 2113604 A | 8/1983 |
| IN | 490CHENP2010 A | 7/2010 |
| IN | 1895KOLNP2014 A | 12/2014 |
| JP | 1989078946 A | 3/1989 |
| JP | 1990196655 A | 8/1990 |
| JP | 2016078707 A | 5/2016 |
| JP | 2016078708 A | 5/2016 |
| MX | 2016017171 A | 6/2018 |

OTHER PUBLICATIONS

TheRAUcollection, Rolls-Royce and Bentley—Bookmatching Veneer for Wood Trim, May 29, 2012, https://www.youtube.com/watch?v=avlJBc8BIPs (Year: 2012).*

Jack Bench Woodworking, Fun with Wood Veneer!—4 Way Book Match, Dec. 9, 2016, htttps://www.youtube.com/watch?v=Sylgw0udsT4 (Year: 2016).*

* cited by examiner

TEST DATA

| Angle (Degrees) | Angle (Rad) | Grain Width (in) | Thickness (in) | Hypotenuse Length |
|---|---|---|---|---|
| 7.6 | 0.1326 | 0.1663 | 0.022 | 0.1663 |
| 10 | 0.1745 | 0.1267 | 0.022 | 0.1267 |
| 20 | 0.3491 | 0.0643 | 0.022 | 0.0643 |
| 30 | 0.5236 | 0.0440 | 0.022 | 0.0440 |
| 32 | 0.5585 | 0.0415 | 0.022 | 0.0415 |
| 35 | 0.6109 | 0.0384 | 0.022 | 0.0384 |
| 45 | 0.7854 | 0.0311 | 0.022 | 0.0311 |
| 50 | 0.8727 | 0.0287 | 0.022 | 0.0287 |
| 60 | 1.0472 | 0.0254 | 0.022 | 0.0254 |
| 70 | 1.2217 | 0.0234 | 0.022 | 0.0234 |

FIG. 3A

METHOD AND SYSTEM FOR SEQUENCING VENEER TO LUMBERCORE

BACKGROUND

Consumers in the aviation or automotive industry may require matching veneer in sheet and lumbercore form across a purchased lineup or fleet of vehicles (e.g., airplanes, automobiles, or like). Veneer, however, may be dependent on the lumber, which may be different even if manufactured from the same species. Due to the varieties of color, grain width, and grain pattern, matching veneer in sheet and lumbercore form may be difficult.

SUMMARY

A method for sequencing lumbercore from veneer is disclosed, in accordance with one or more embodiments of the disclosure. The method may include, but is not limited to, receiving a veneer grain width input and a veneer thickness input. The method may include, but is not limited to, determining a cut angle based on the veneer grain width input and the veneer thickness input. The method may include, but is not limited to, receiving a lumbercore width input and a lumbercore height input. The method may include, but is not limited to, determining a set of dimensions for a stack of lumber. The method may include, but is not limited to, generating a template mapping the lumbercore to the stack. The template is based on the lumbercore width input, the lumbercore height input, and the set of dimensions for the stack of lumber. The template includes the cut angle. The lumbercore is rotated relative to horizontal at the cut angle within the stack of lumber.

In some embodiments, the method may include, but is not limited to, obtaining a plurality of sheets of veneer. The method may include, but is not limited to, obtaining a reference sheet of veneer. The method may include, but is not limited to, generating the stack of lumber from the plurality of sheets of veneer.

In some embodiments, the set of dimensions for the stack of lumber including a stack width, a stack height, and a number of sheets of veneer for the plurality of sheets of veneer. The plurality of sheets of veneer each has a select thickness.

In some embodiments, the select thickness of a sheet of veneer within the plurality of sheets of veneer is approximately equal to a thickness of the reference sheet of veneer.

In some embodiments, the dimensions of the lumbercore being defined within the set of dimensions of the stack of lumber, with the lumbercore width input being less than the stack width of the stack of lumber and the lumbercore height input being less than the stack height of the stack of lumber.

In some embodiments, the generating the stack of lumber from the plurality of sheets of veneer may include, but is not limited to, sequencing the plurality of sheets of veneer. The generating the stack of lumber from the plurality of sheets of veneer may include, but is not limited to, applying an adhesive between adjacent sheets of the plurality of sheets of veneer.

In some embodiments, the adhesive includes a clear epoxy resin.

In some embodiments, the generating the stack of lumber from the plurality of sheets of veneer may include, but is not limited to, firetreating the plurality of sheets of veneer prior to applying the adhesive between the adjacent sheets of the plurality of sheets of veneer.

In some embodiments, the method may include, but is not limited to, applying the template to the stack of lumber. The method may include, but is not limited to, cutting the lumbercore from the stack of lumber at the cut angle included in the template.

In some embodiments, the template being applied to an end surface of the stack of lumber.

In some embodiments, the template further including an inside block representing the lumbercore, the inside block rotated relative to horizontal an amount equal to the cut angle within an outside block, the outside block representing the stack of lumber.

In some embodiments, the lumbercore including a portion of the plurality of sheets of veneer after the lumbercore is cut from the stack of lumber, the portion of the plurality of sheets of veneer being set relative to horizontal at the cut angle through the end surface of the lumbercore.

In some embodiments, the reference sheet of veneer and a top surface of the lumbercore having at least one of a matching color, grain width, or grain pattern.

In some embodiments, the top surface of the lumbercore including a plurality of edges of the portion of the plurality of sheets of veneer, at least one of the matching color, grain width, or grain pattern being visible across the plurality of edges of the plurality of sheets of veneer after the lumbercore is cut from the stack of lumber.

A lumbercore sequenced from veneer is disclosed, in accordance with one or more embodiments of the disclosure. The lumbercore includes a portion of a plurality of sheets of veneer with an adhesive applied between adjacent sheets of the portion of the plurality of sheets of veneer. The portion of the plurality of sheets of veneer is rotated relative to horizontal at a cut angle through a cross-section of the lumbercore. The cut angle is determined from a veneer grain width and a veneer thickness. The plurality of sheets of veneer are cut from a stack of lumber at the cut angle based on a template including the cut angle, the template based on a lumbercore width, a lumbercore height, and a set of dimensions for the stack of lumber. The set of dimensions for the stack of lumber includes a stack width, a stack height, and a number of sheets of veneer for the plurality of sheets of veneer.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3A illustrates an example set of data used for sequencing veneer to lumbercore, in accordance with one or more embodiments of the disclosure;

DETAILED DESCRIPTION OF THE INVENTION

Figure 1:
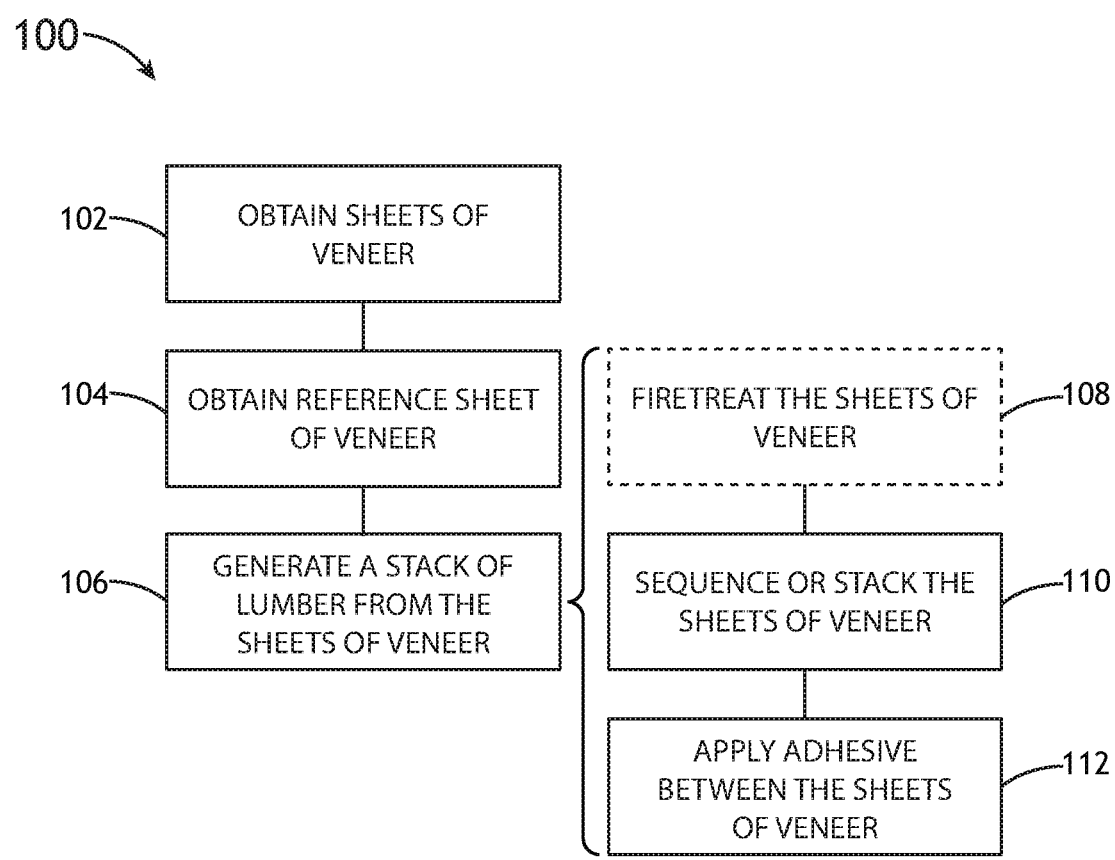
FIG. 1 is a flow diagram illustrating a method for sequencing veneer to lumbercore, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-8 generally illustrate a method and system for sequencing veneer to lumbercore, in accordance with one or more embodiments of the disclosure.

With natural veneer, lumber may be cut from trees of the same species. However, the trees may be located in numerous places around the world, which may result in variances of color, grain width, and/or grain pattern within the lumber. With composite veneer, a tree may be broken down and meshed into a block with the addition of color. Composite veneer, while more likely to match across different sources than natural veneer, may be cost-prohibitive in terms of long lead time and/or the size of the bulk order that may be required.

As such, it would be beneficial to provide a method and system for sequencing veneer to lumbercore that fabricates lumbercore from natural veneer while matching color, grain pattern, and grain width. The fabricated lumbercore may address or offset the possibility of variances within the natural veneer. The fabricated lumbercore may be cut to custom size in a more cost-effective manner than the composite lumbercore.

FIG. 1 is a flow diagram illustrating a method 100 for sequencing veneer to lumbercore, in accordance with one or more embodiments of the disclosure.

In a step 102, sheets of veneer may be obtained. The sheets of veneer may include a select color, grain width, and/or grain pattern. The sheets of veneer may be obtained from the same batch of lumber. It is noted herein, however, that the sheets of veneer may be obtained from different sources.

Figure 7A:
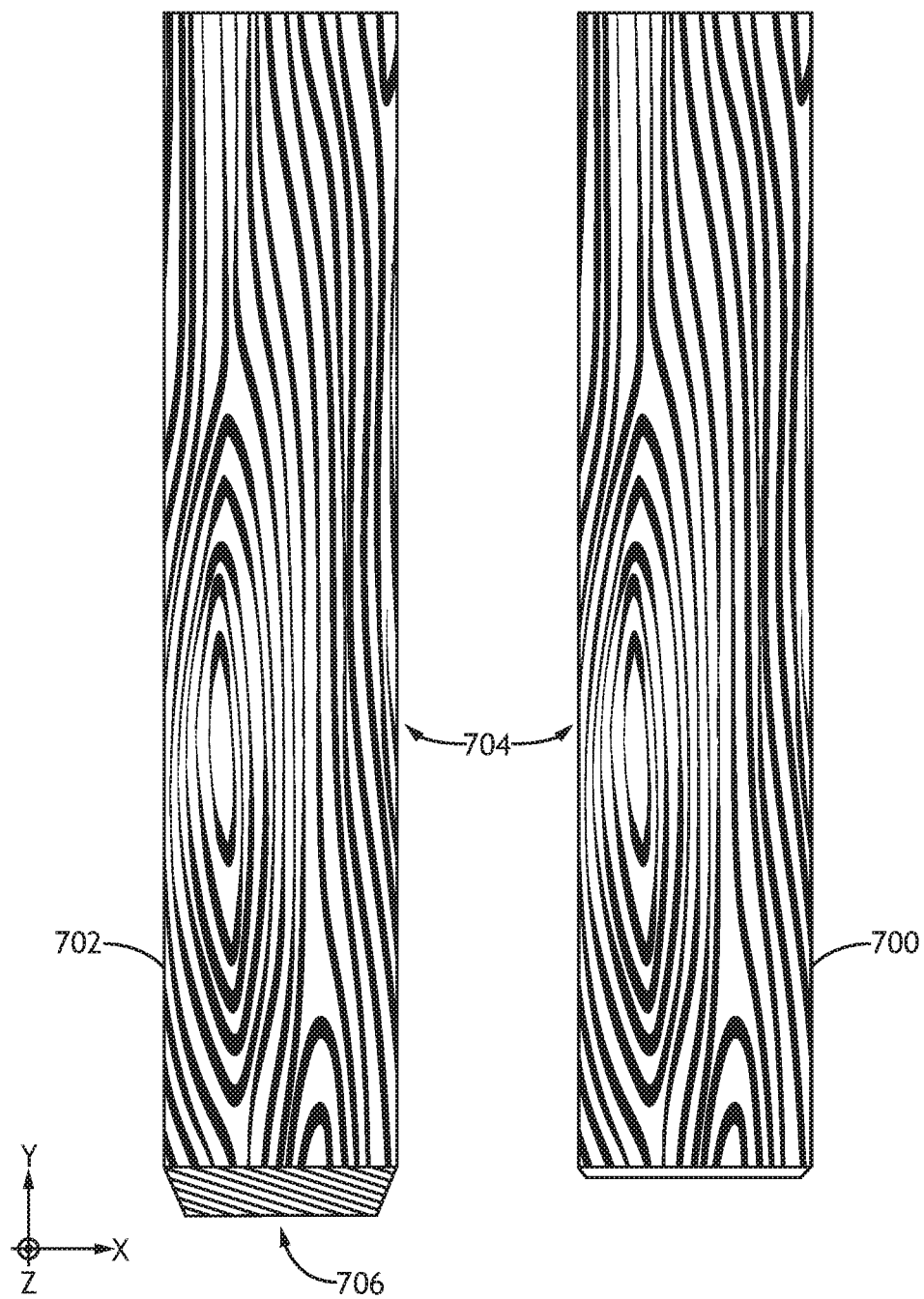
FIG. 7A illustrates veneer and lumbercore generated from a method for sequencing veneer to lumbercore, in accordance with one or more embodiments of the disclosure.
Figure 7B:
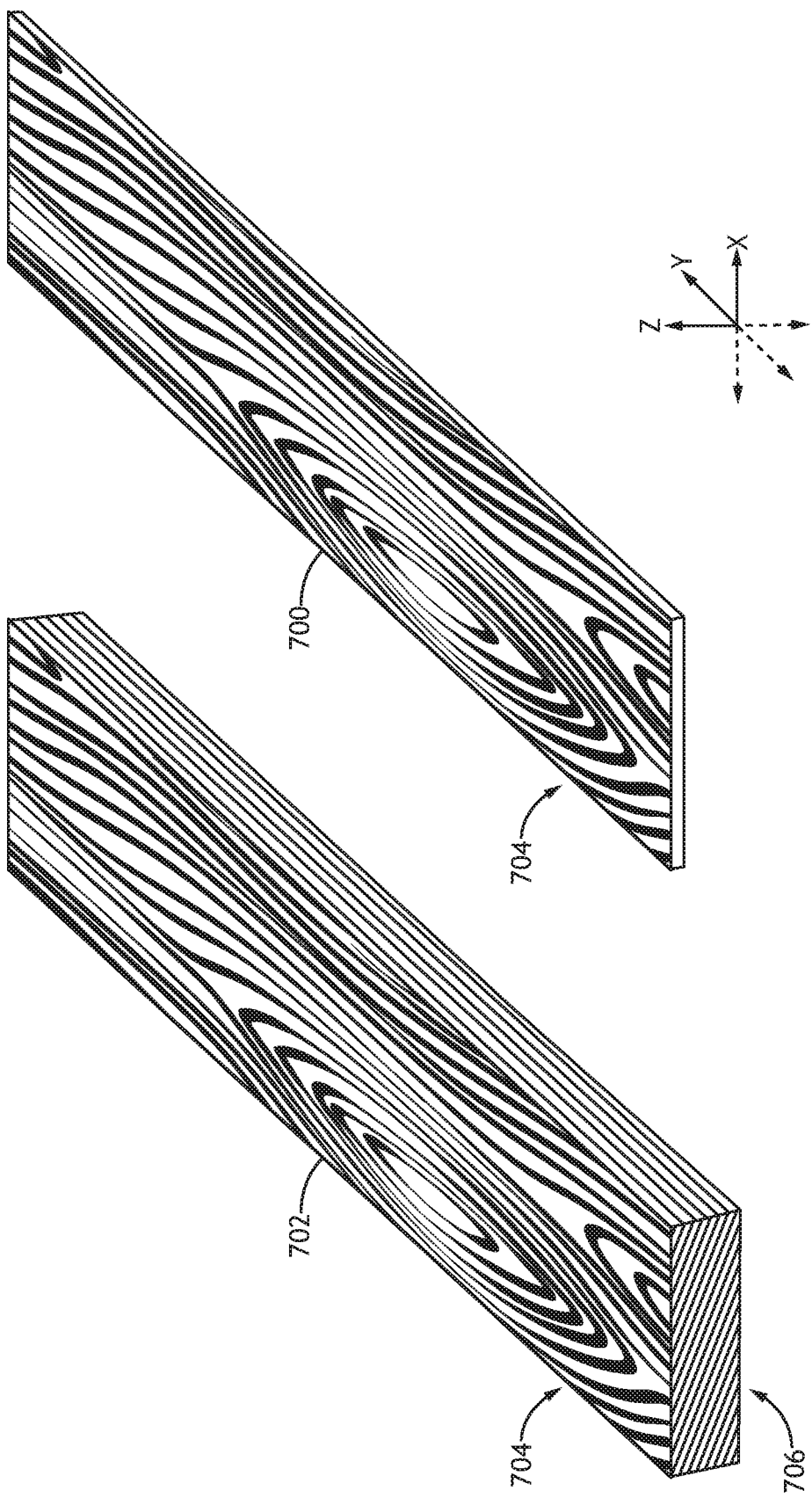
FIG. 7B illustrates veneer and lumbercore generated from a method for sequencing veneer to lumbercore, in accordance with one or more embodiments of the disclosure.
Figure 7C:
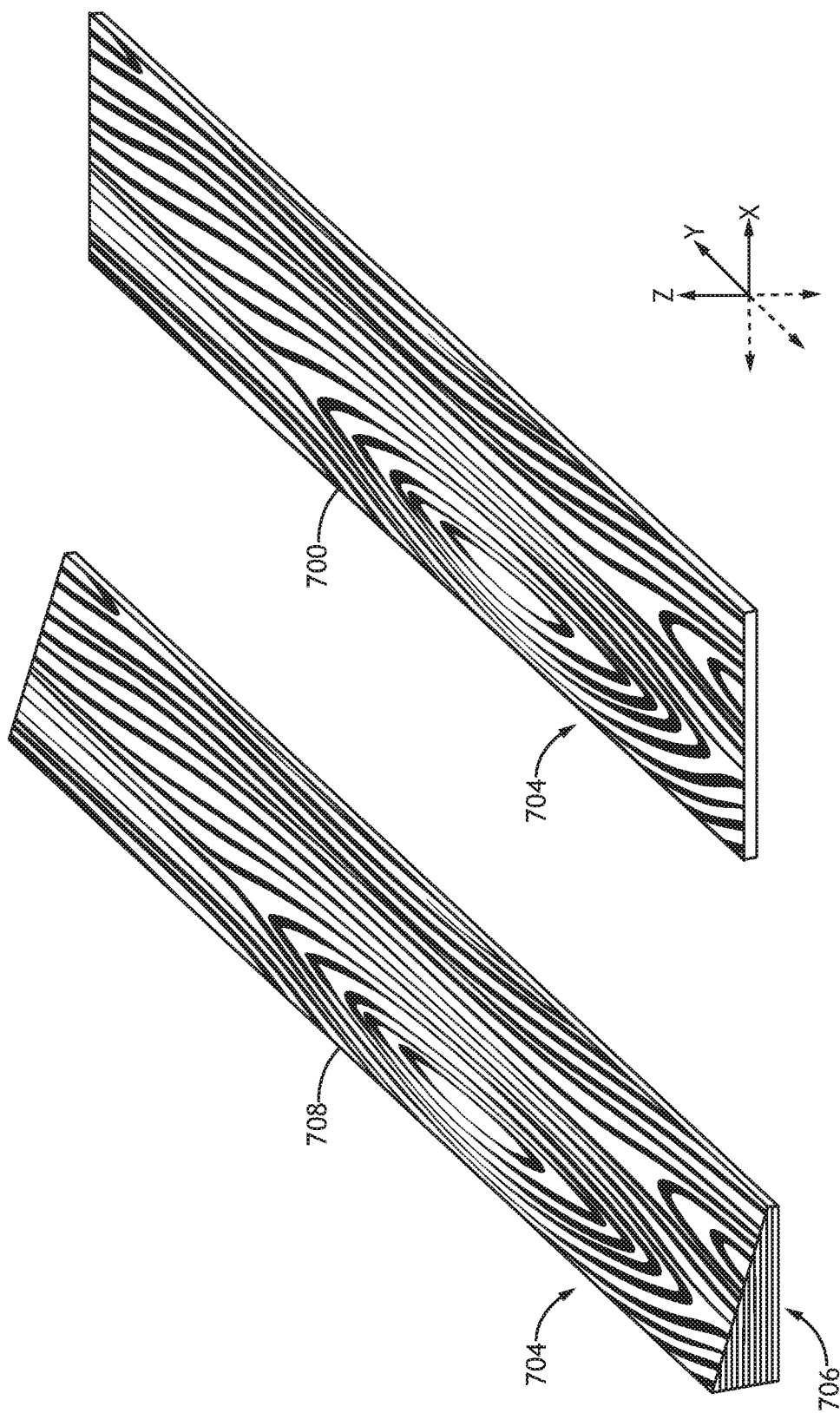
FIG. 7C illustrates veneer and lumbercore generated from a method for sequencing veneer to lumbercore, in accordance with one or more embodiments of the disclosure.

In a step 104, a reference sheet of veneer may be obtained. The reference sheet of veneer (e.g., a sheet of veneer 700, as illustrated in FIGS. 7A-7C) may include a select color, grain width, and/or grain pattern. The sheets of veneer and the reference sheet of veneer may be obtained from the same batch of lumber. It is noted herein, however, that the sheets of veneer and the reference sheet of veneer may be obtained from different sources. For example, the reference sheet of veneer may be obtained from a person needing a lumbercore with matching color, grain width, and/or grain pattern to be fabricated from the sheets of veneer. By way of another example, the reference sheet of veneer may be a sample previously installed within a vehicle (e.g., an airplane, automobile, or the like) with a color, grain width, and/or grain pattern to be matched in lumbercore fabricated from the sheets of veneer.

In a step 106, a stack of lumber may be generated from the sheets of veneer. Generating the stack of lumber may require one or more steps 108, 110, 112. It is noted herein, however, that the step 106 is not limited to the steps provided. In addition, the step 106 may include more or fewer steps. Further, the step 106 may include performing the steps 108, 110, 112 in an order other than provided. Therefore, the description should not be interpreted as a limitation on the scope of the disclosure but merely an illustration.

In an optional step 108, the sheets of veneer may be firetreated. Each sheet of veneer may be firetreated separately prior to being used to generate the stack of lumber. The sheets of veneer may be firetreated individually, in batches, or in bulk prior to being used to generate the stack of lumber.

In a step 110, the sheets of veneer may be stacked. Stacking the sheets of veneer may include sequencing the sheets of veneer based on the original location of each sheet of veneer in the processed tree, such that a pattern may be replicated by being overlapped multiple times. It is noted herein, however, that the sheets of veneer may be stacked in any order (e.g., without regard to the original location in the processed tree from which the sheets of veneer were obtained.

In a step 112, an adhesive may be applied between the sheets of veneer. The adhesive may be applied between each set of adjacent sheets of veneer within the sequence or stack. The adhesive may include, but is not limited to, an epoxy resin, wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concerned of unwanted color (e.g., a white or yellow layer). By way of another example, the epoxy resin may be a two-part epoxy resin.

Figure 2:
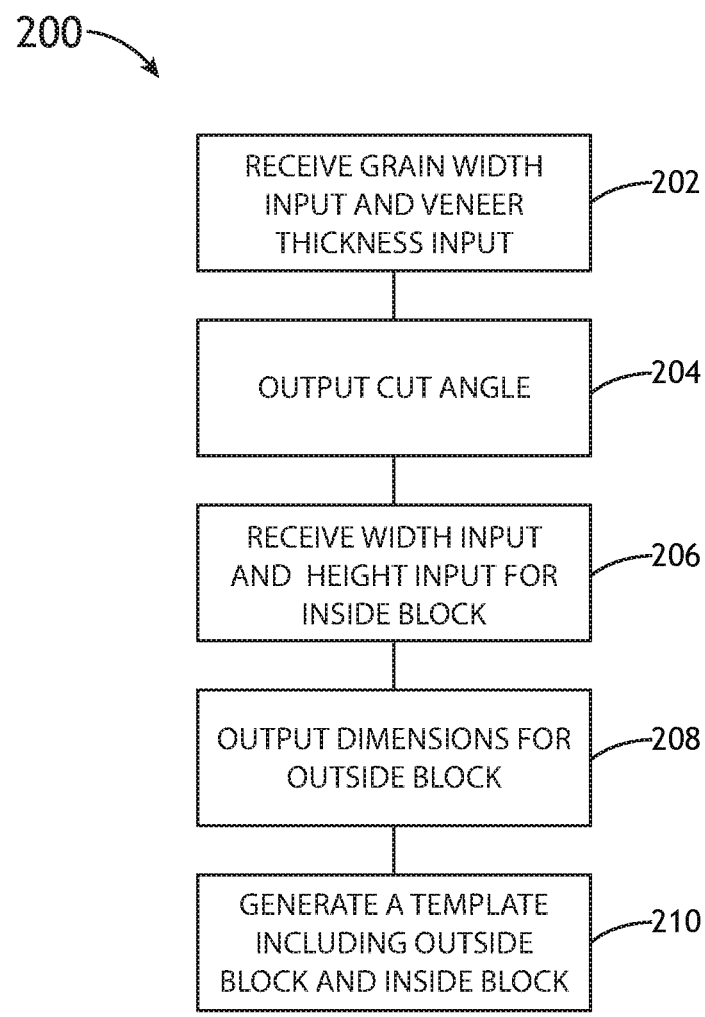
FIG. 2 is a flow diagram illustrating a method for sequencing veneer to lumbercore, in accordance with one or more embodiments of the disclosure.

FIG. 2 is a flow diagram illustrating a method 200 for sequencing veneer to lumbercore, in accordance with one or more embodiments of the disclosure.

In a step 202, a grain width input and a veneer thickness input may be received. In a step 204, a cut angle may be output. The cut angle may be output based on a stored set of data correlating the grain width input and the veneer thickness input to a particular cut angle. The cut angle may be determined from the input grain width and veneer thickness being run through an algorithm defined in part from example test data. Example test data is illustrated in FIGS. 3A and 3B.

Figure 3B:
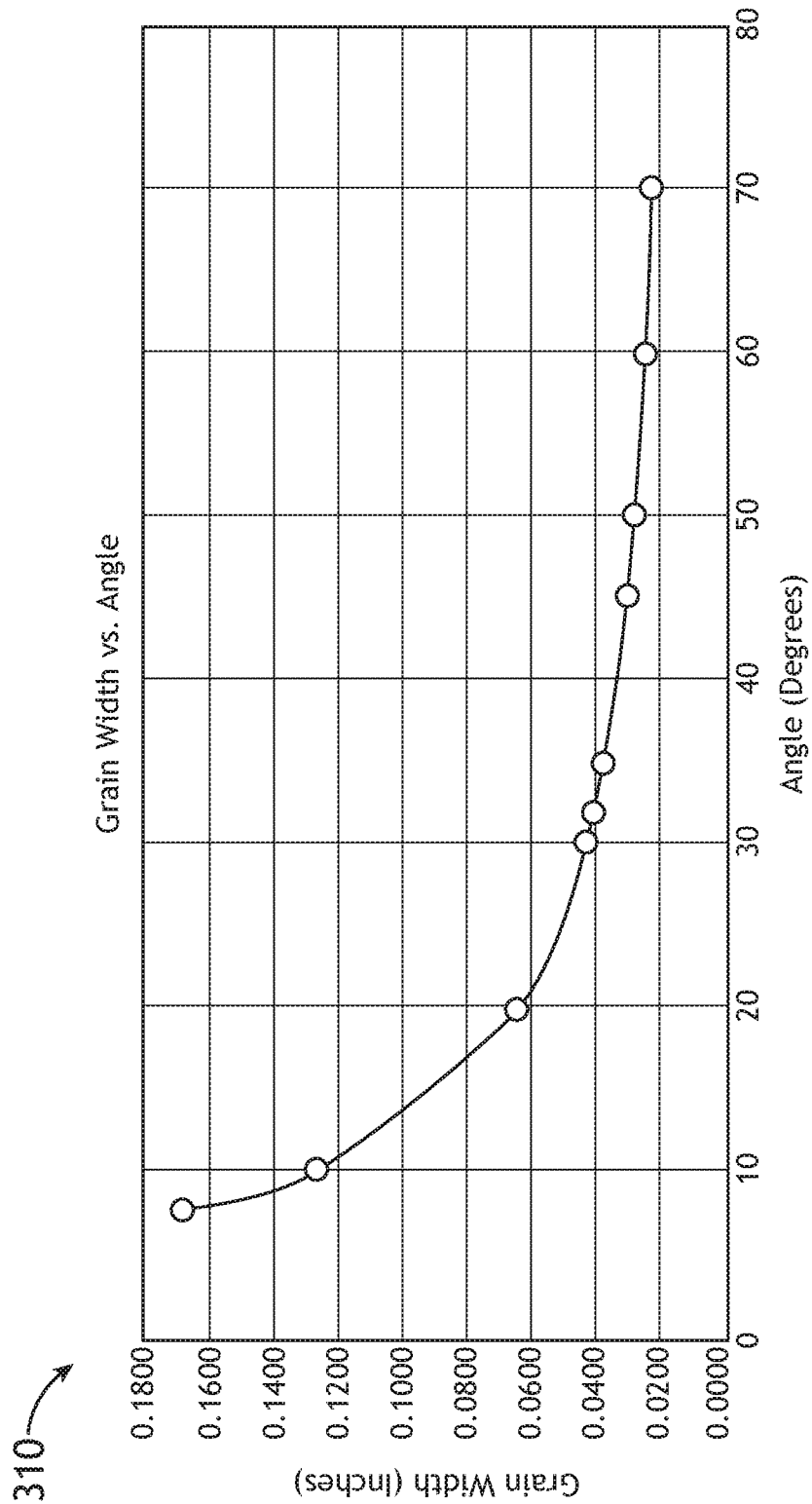
FIG. 3B illustrates a graph including an example set of data used for sequencing veneer to lumbercore, in accordance with one or more embodiments of the disclosure.

Referring now to FIG. 3A, the data in a table 300 includes cut angle in degrees and radians, an input grain width (in inches), an input thickness (in inches), and a hypotenuse length (in inches). Referring now to FIG. 3B, the data in the table 300 is displayed in a graph 310 as a function of grain width (in inches) versus angle (in degrees). The data presented in the table 300 and illustrated in the graph 310 provide a correlation between the output cut angle and the input grain width. Specifically, a smaller grain width may require a larger cut angle.

Referring again to FIG. 2, it is noted herein an adjusted veneer thickness may be determined and/or output in addition to or instead of the cut angle. The adjusted veneer thickness may be output based on a stored set of data correlating the grain width input and the veneer thickness input to a particular adjusted veneer thickness. The adjusted veneer thickness may be determined from the input grain width and veneer thickness being run through an algorithm defined in part from example test data.

In a step 206, a width input and a height input for an inside block may be received. The inside block may represent the lumbercore cut from the outside block at the determined cut angle. In this regard, the terms "inside block" and "lumbercore" may be considered equivalent, for purposes of the disclosure.

In a step 208, dimensions for the outside block may be output. The dimensions may be determined from the inside block width, the inside block height, and the cut angle based on a stored set of data correlating the inside block width, the inside block height, and the cut angle to a particular set of dimensions. The dimensions may be output following the inside block width, the inside block height, and the cut angle being run through an algorithm. The outside block may represent the stack of lumber fabricated using the method 100. In this regard, the terms "outside block" and "stack of lumber" may be considered equivalent, for purposes of the present disclosure. The inside block 402 may be cut from the outside block 410 at the cut angle 408.

Figure 4:
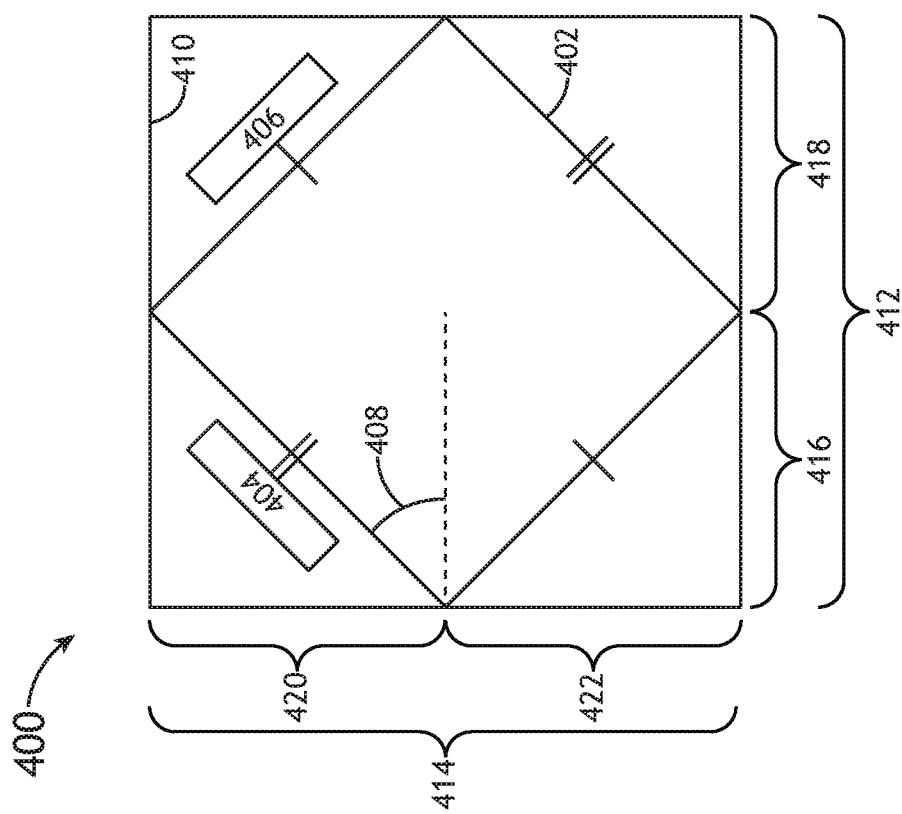
FIG. 4 illustrates an example graphic comparing input data and output data for sequencing veneer to lumbercore, in accordance with one or more embodiments of the disclosure.

FIG. 4 illustrates an example graphic 400 comparing an inside block 402 including an inside block width 404 and an inside block height 406, a cut angle 408, and an outside block 410 including an outside block width 412 and an outside block height 414, in accordance with one or more embodiments of the disclosure.

From the inside block width 404 and the inside block height 406 of the inside block 402, as well as the cut angle 408, the outside block 410 including the outside block width 412 and the outside block height 414 may be determined. The outside block width 412 and the outside block height 414 may be separated into sections defining the areas of the outside block 410 to be removed when cutting out the inside block 402.

The outside block 410 may be defined by a number of veneer sheets required, based on a veneer sheet thickness. The veneer sheet thickness, like the cut angle 408, may be of particular importance to a manufacturer. For example, ensuring a veneer sheet thickness for the sheets of veneer from which the outside block 410/stack of lumber is fabricated is approximately equal to a thickness of the sheet of reference veneer may be necessary to match the fabricated inside block 402/lumbercore to the reference sheet of veneer.

The inside block width 404, the inside block height 406, the outside block width 412, and/or the outside block height 414 may be provided (e.g., displayed on a display device, printed, or the like) in actual dimensions (e.g., in inches, centimeters, or the like) and/or in scaled unitless dimensions. For example, the scaled unitless dimensions may be usable to fabricate a scaled replica of the outside block 410 and the contained inside block 402.

In one example, where the input grain width is 0.125 inches and the input veneer thickness is 0.022 inches, the cut angle 408 is 10.137 degrees (or 0.177 radians) and the adjusted veneer thickness (or hypotenuse length) is 0.033 inches. In addition, the inside block 402 is defined by an inside block width 404 of 4.00 inches and an inside block height 406 of 1.75 inches. From the inside block width 404, the inside block height 406, and the cut angle 408, the determined outside block width 412 may be 4.25 inches with a first section 416 of 0.31 inches and a second section 418 of 3.94 inches, and the outside block height 414 may be 2.42 inches with a first section 420 of 0.70 inches and a second section 422 of 1.72 inches. In terms of scaled unitless dimensions, the inside block width 404 may be 287.77 and the inside block height 406 may be 125.90, while the outside block width 412 may be 305.44 and the outside block height 414 may be 174.58. Generating the inside block 402/lumbercore with the listed dimensions from the outside block 410/stack of lumber may require a stack of lumber formed from 69.33 sheets of veneer.

Referring again to FIG. 2, in a step 210, a template for the inside block 402 may be generated. The template may include the outside block 410 and the inside block 402.

Figure 5:
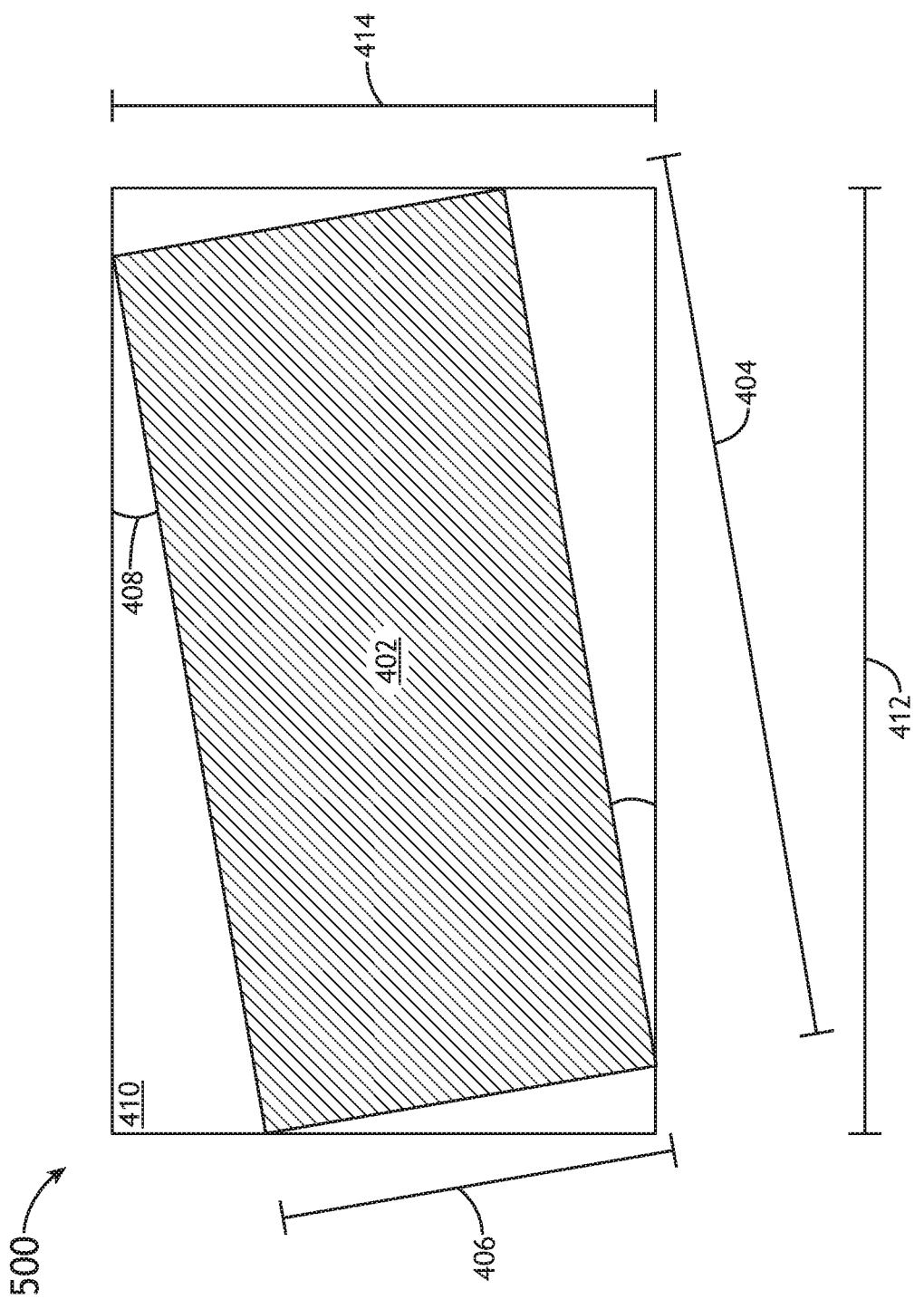
FIG. 5 illustrates a template generated via a method for sequencing veneer to lumbercore, in accordance with one or more embodiments of the disclosure.

FIG. 5 illustrates a template 500 generated via the method 200 for sequencing veneer to lumbercore, in accordance with one or more embodiments of the disclosure.

The template 500 (e.g., a screenprint, a printed image, a laser-etched image, a mapped image for an automated fabrication tool, or the like) may include the inside block 402 with inside block width 404 and inside block height 406. The template 500 may include the outside block 410 with outside block width 412 and outside block height 414.

The template 500 may map the inside block 402 within the outside block 410. The inside block 402 may be rotated within the outside block 410 relative to horizontal (e.g., as defined by an x-axis, as illustrated in FIGS. 7A and 7B) by an amount equal to the cut angle 408. For example, the inside block 402 may be rotated within the outside block 410 relative to horizontal about a y-axis, as defined in FIGS. 7A and 7B. It is noted herein, however, that the inside block 402 may be rotated within the outside block 410 relative to any axis or plane to ensure the correct color, grain width, and/or grain pattern of the reference sheet of veneer is matched by the inside block 402/lumbercore.

The template 500 may include one or more instances of the cut angle 408 between the inside block 402 and the outside block 410. For example, the template 500 may include multiple instances of the same cut angle 408. It is noted herein, however, that the template 500 may include different cut angles, depending on what may be necessary to match color, grain width, and/or grain pattern. However, it is contemplated that having the cut angles within the template 500 be as similar as possible may result in the ends of the sheets of veneer in the inside block 402 collectively display a color, grain width, and/or grain pattern that is the same as the reference sheet of veneer.

The template 500, when combined with the quantitative values 404, 406, 412, 414, and the number of veneer sheets necessary to produce the stack of lumber, may be an instruction about how to fabricate the stack of lumber and at which angle to cut the stack of lumber to replicate the color, grain width, and/or grain pattern of the reference sheet of veneer. For example, the template 500 may include the inside block 402 and/or the outside block 410. For instance, the template 500 may include actual dimensions (e.g., in inches, centimeters, or the like) and/or scaled unitless dimensions for the inside block 402 and/or the outside block 410. By way of another example, the template 500 may include the cut angle 408 from which to cut the outside block 410 to produce the inside block 402. By way of another example, the template 500 may include the number of veneer sheets necessary to produce the outside block 410/stack of lumber.

Figure 8:
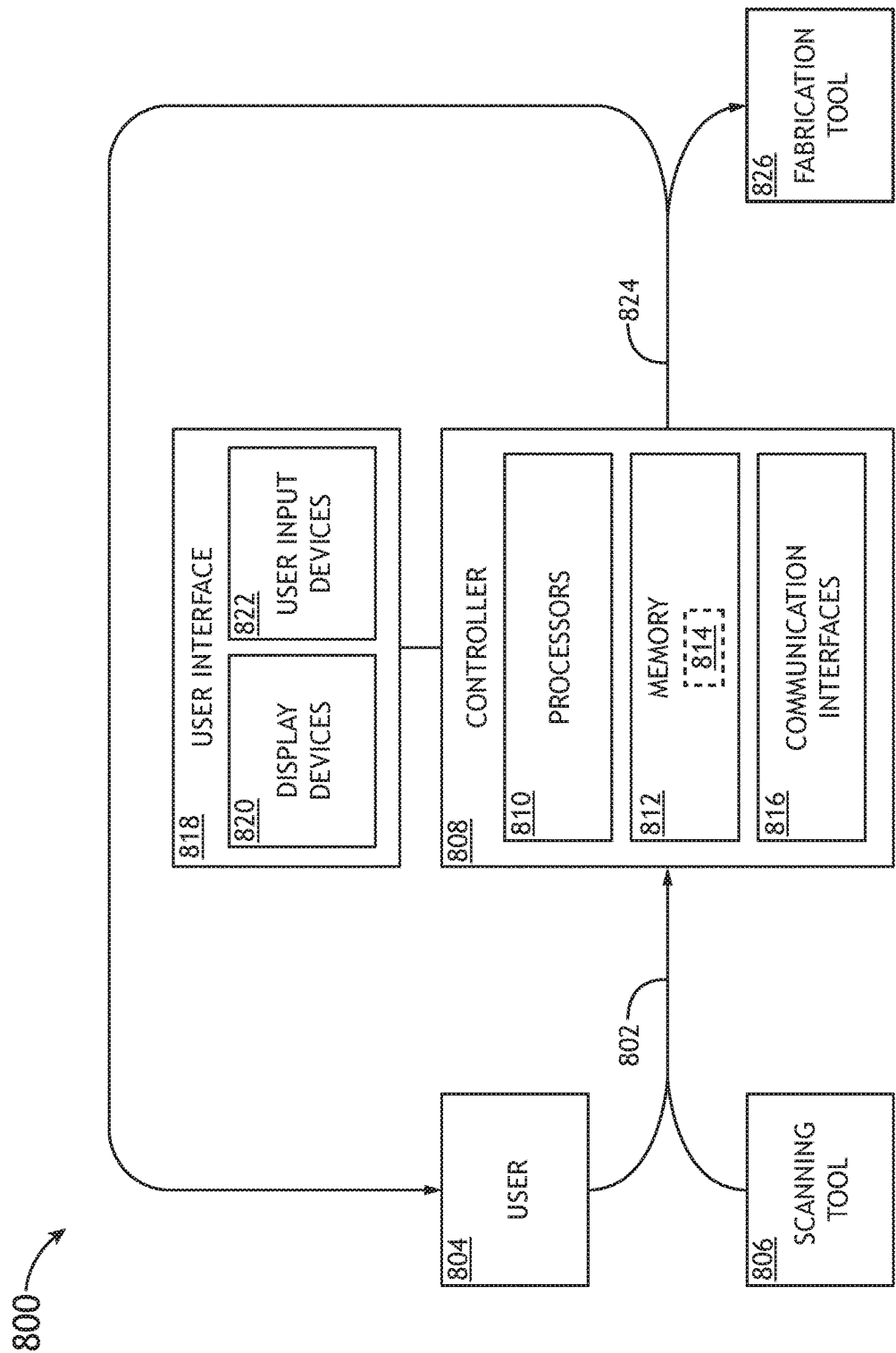
FIG. 8 illustrates a system for sequencing veneer to lumbercore, in accordance with one or more embodiments of the disclosure.

The template may be displayed on a display device (e.g., a display device 820, as illustrated in FIG. 8). The template may be printed as an image that may be affixed to a surface of the outside block 410/stack of lumber (e.g., on an end surface of the stack of lumber defined by an x-z plane, as illustrated in FIGS. 7A and 7B). The template may be directly printable on the outside block 410/stack of lumber (e.g., on the end surface of the stack of lumber defined by the x-z plane, as illustrated in FIGS. 7A and 7B). The template may be transmitted to a fabrication tool (e.g., a fabrication tool 826, as illustrated in FIG. 8) for cutting the inside block 402/lumbercore from the outside block 410/stack of lumber.

Figure 6:
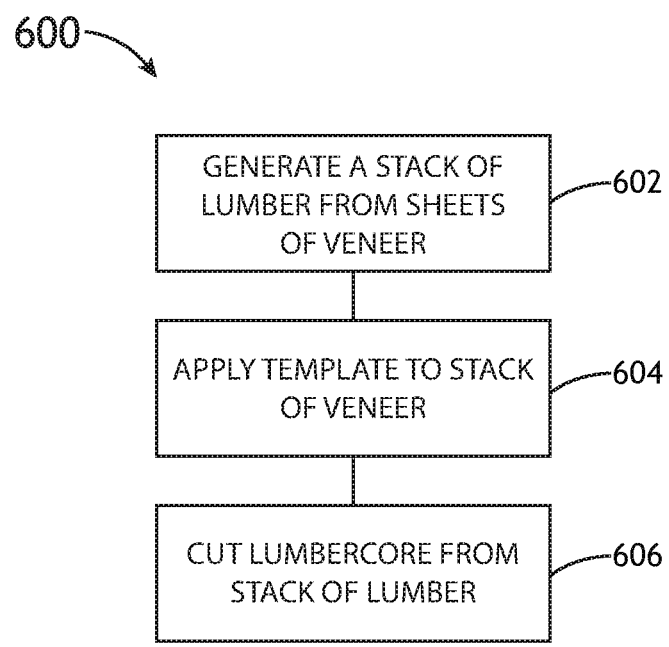
FIG. 6 is a flow diagram illustrating a method for sequencing veneer to lumbercore, in accordance with one or more embodiments of the disclosure.

FIG. 6 is a flow diagram illustrating a method 600 for sequencing veneer to lumbercore, in accordance with one or more embodiments of the disclosure.

In a step 602, a stack of lumber may be generated from sheets of veneer. The stack of lumber may be generated via one or more steps of the method 100.

In a step 604, a template may be applied to the stack of lumber. The template may be generated via one or more steps of the method 200.

In a step 606, lumbercore may be produced (e.g., cut, sanded, or the like) from the stack of lumber. The lumbercore may match to the color, grain width, and/or grain pattern of a reference sheet of veneer. In one example, the lumbercore may be used as a single piece or as a set of pieces within an installation, while the reference sheet of veneer may be used as trim for the installation.

For example, the template 500 may be applied to the stack of lumber (e.g., to the end surface of the stack of lumber defined by an x-z plane, as illustrated in FIGS. 7A and 7B). Using the template 500 may allow for the lumbercore to be cut at the cut angle 408 from the stack of lumber. Where the stack of lumber was formed from adhesive layers between sheets of veneer, the stack of lumber may be cut (e.g., at the cut angle 408), sanded, or otherwise processed without revealing the entirety of any particular adhesive layer between adjacent sheets of veneer in the stack of lumber. More generally, where the stack of lumber was formed from adhesive layers between sheets of veneer, the stack of lumber may be cut (e.g., at the cut angle 408), sanded, or otherwise processed to avoid or minimize showing of the adhesive layers between the sheets of veneer. It is noted herein that avoiding the adhesive layer may produce a consistent veneer across a lumbercore. In addition, it is noted herein that avoiding the adhesive layer may result in wear and tear being the same both for the reference sheet of veneer and for the lumbercore.

In this regard, the methods for sequencing veneer to lumbercore recreates a color, grain width, and/or grain pattern by manipulating a generated stack of lumber based on a veneer selected or provided by a user (e.g., a consumer, manufacturer, or other individual involved with the selection of the veneer being sequenced). The methods may result in the production of lumbercore with color, grain width, and/or grain pattern that matches the selected or provided veneer, to ensure a consistent veneer across all applications (e.g., as solid fixtures and/or as trim on non-patterned material (e.g., plastic, wood, or the like)) within a vehicle (e.g., within an automobile, an airplane, or the like).

The methods 100, 200, and/or 600 are not limited to the steps and/or sub-steps provided. The methods 100, 200, and/or 600 may include more or fewer steps and/or sub-steps. The methods 100, 200, and/or 600 may perform the steps and/or sub-steps in an order other than provided. Therefore, the above description should not be interpreted as a limitation on the scope of the disclosure but merely an illustration.

FIGS. 7A-7C illustrate a reference sheet of veneer 700 and lumbercore 702 fabricated from the method for sequencing veneer to lumbercore, in accordance with one or more embodiments of the disclosure.

FIGS. 7A and 7B illustrate the reference sheet of veneer 700 and the lumbercore 702. The lumbercore 702 may be cut from a stack of lumber fabricated via one or more steps of the method 100 based on the template 500 generated via one or more steps of the method 200.

The lumbercore 702 may include a portion of the multiple layers 706 of the sheets of veneer. The portion of the multiple layers 706 may be set at an angle relative to horizontal through the end surface or cross-section surface (e.g., as defined by an x-z plane) of the lumbercore 702, where the lumbercore 702 is cut from the stack of lumber based on the template 500 including the cut angle 408. It is noted herein that the edges of the multiple layers 706 may be visible in a top surface (e.g., as defined by an x-y plane) of the lumbercore 702.

One or more surfaces of the lumbercore 702 and the reference sheet of veneer 700 may match. For example, the color of the top surface of the lumbercore 702 may match the color of the top surface of the reference sheet of veneer 700 where the adhesive between the multiple layers of veneer is clear, as provided in the top surface of the lumbercore 702 by the edges of the layers 706 that show when the lumbercore 702 is cut from the stack of lumber. By way of another example, the top surface of the reference sheet of veneer 700 and the top surface of the lumbercore 702 may include the same grain 704 (e.g., grain width and/or grain pattern) where the stack of lumber is generated be sequencing sheets of veneer. It is noted herein the lumbercore 702 may have the same veneer on its top and/or down its side as the reference sheet of veneer 700.

FIG. 7C illustrates the reference sheet of veneer 700 and a remnant 708 of the stack of lumber following the cutting out of the lumbercore 702 based on the template 500. As illustrated in FIG. 7C, the layers 706 of the sheets of veneer remnant 708 may be horizontal, matching the layering of the sheets of veneer when fabricating the stack of lumber.

FIG. 8 illustrates a system 800 for sequencing veneer to lumbercore, in accordance with one or more embodiments of the disclosure.

A set of data 802 may be received by one or more controllers 808 of the system 800. The set of data 802 may include a data defining a particular color, grain width, grain pattern, and/or veneer thickness of a reference sheet of veneer. The set of data 802 may include a width input and/or a height input for lumbercore to be cut from a stack of lumber.

The set of data 802 may be received from a user 804. For example, the user 804 may include a consumer, a manufacturer, or other individual involved with the selection of the veneer being sequenced. It is noted herein the set of data 802 may be received by the one or more controllers 808 either directly or indirectly (e.g., through an intermediary, where the consumer passes the set of data 802 to the manufacturer and the manufacturer uploads the data).

The set of data 802 may be received from a scanning tool 806. For example, where the lumbercore needs to match a previously-used and/or installed veneer in a vehicle (e.g., airplane, automobile, or the like), the color, grain width, and/or grain pattern may be scanned with a scanning tool 806 to generate the set of data 802.

The one or more controllers 808 may include may include at least one of one or more processors 810, memory 812 configured to store one or more sets of program instructions 814, and/or one or more communication interfaces 816.

The one or more processors 810 provides processing functionality for at least the one or more controllers 808 and may include any number of processors, micro-controllers, circuitry, field programmable gate array (FPGA) or other processing systems, and resident or external memory for storing data, executable code, and other information accessed or generated by the one or more controllers 808. The one or more processors 810 may execute one or more software programs (e.g., the one or more sets of program instructions 814) embodied in a non-transitory computer readable medium (e.g., the memory 812) that implement techniques described herein. The one or more processors 810 are not limited by the materials from which it is formed or the processing mechanisms employed therein and, as such, may be implemented via semiconductor(s) and/or transistors (e.g., using electronic integrated circuit (IC) components), and so forth.

The memory 812 may be an example of tangible, computer-readable storage medium that provides storage functionality to store various data and/or program code associated with operation of the one or more controllers 808 and/or one or more processors 810, such as software programs and/or code segments, or other data to instruct the one or more processors 810 and/or other components of the one or more controllers 808, to perform the functionality described herein. Thus, the memory 812 may store data, such as a program of instructions for operating the one or more controllers 808, including its components (e.g., one or more processors 810, the one or more communication interfaces 816, or the like), and so forth. It should be noted that while a single memory 812 is described, a wide variety of types and combinations of memory (e.g., tangible, non-transitory memory) may be employed. The memory 812 may be integral with the one or more processors 810, may include stand-alone memory, or may be a combination of both. Some examples of the memory 812 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 808 may be configured to perform one or more process steps, as defined by the one or more sets of program instructions 814. The one or more process steps may be performed iteratively, concurrently, and/or sequentially. The one or more sets of program instructions 814 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 814 may be configured to operate via proportional control, feedback control, feedforward control, integral control, proportional-derivative (PD) control, proportional-integral (PI) control, proportional-integral-derivative (PID) control, or the like.

The one or more communication interfaces 816 may be operatively configured to communicate with components of the one or more controllers 808. For example, the one or more communication interfaces 816 may be configured to retrieve data from the one or more processors 810 or other devices, transmit data for storage in the memory 812, retrieve data from storage in the memory 812, and so forth. The one or more communication interfaces 816 may also be coupled (e.g., physically, electrically, and/or communicatively) with the one or more processors 810 to facilitate data transfer between components of the one or more controllers 808 and the one or more processors 810. It should be noted that while the one or more communication interfaces 816 is described as a component of the one or more controllers 808, one or more components of the one or more communication interfaces 816 may be implemented as external components coupled (e.g., physically, electrically, and/or communicatively) to the one or more controllers 808 via a wired and/or wireless connection. The one or more controllers 808 may also include and/or connect to one or more input/output (I/O) devices. In some embodiments, the one or more communication interfaces 816 includes or is coupled (e.g., physically, electrically, and/or communicatively) to a transmitter, receiver, transceiver, physical connection interface, or any combination thereof.

The one or more controllers 808 may be coupled (e.g., physically, electrically, and/or communicatively) to one or more user interfaces 818. The one or more user interfaces 818 may include and/or be configured to interact with one or more display devices 820. The one or more user interfaces 818 may include and/or be configured to interact with one or more user input devices 822.

The one or more communication interfaces 816 may be operatively configured to communicate with one or more user interfaces 818. The one or more controllers 808 and the one or more user interfaces 818 may be separate components (e.g., have separate housings and/or separate chassis). It is noted herein, however, that the one or more controllers 808 and the one or more user interfaces 818 may be components integrated in a single housing and/or on a single chassis.

The one or more display devices 820 may include any display device known in the art. For example, the one or more display devices 820 may include, but are not limited to, a liquid crystal display (LCD), a light-emitting diode (LED) display, an organic light-emitting diode (OLED) based display, or the like. Those skilled in the art should recognize that a variety of display devices 820 may be suitable for implementation in the disclosure and the particular choice of display device may depend on a variety of factors, including, but not limited to, form factor, cost, and the like. In a general sense, any display device capable of integration with the one or more user input devices 822 (e.g., touchscreen, bezel mounted interface, keyboard, mouse, trackpad, and the like) is suitable for implementation in the disclosure.

The one or more user input devices 822 may include any data input device known in the art. For example, the one or more user input devices 822 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

The one or more controllers 808 may be configured to determine and/or output a set of data 824. For example, the set of data 824 may include a cut angle for removing lumbercore from a stack of lumber. By way of another example, the set of data 824 may include outside block dimensions (e.g., number of veneer sheets, width, and/or height) for a stack of lumber from which the lumbercore may be removed. By way of another example, the set of data 824 may include a template to remove the lumbercore from the stack of lumber.

For example, the one or more controllers 808 may be configured to determine and/or output the cut angle 408 to the user 804. The user 804 may input the inside block width 404 and the inside block height 406 of an inside block 402/lumbercore. By way of another example, the one or more controllers 808 may be configured to output the template 500 to the user 804. The user 804 may apply the template 500 to an outside block 410/stack of lumber, where the outside block width 412 and the outside block height 414 of the outside block 410 may be determined by the one or more controllers 808. It is noted herein the user 804 may input the data defining a particular color, grain width, grain pattern, and/or veneer thickness of a reference sheet of veneer prior to the determination of the cut angle 408 by the one or more controllers 808.

By way of another example, the one or more controllers 808 may be coupled (e.g., physically, electrically, and/or communicatively) to a fabrication tool 826. The one or more controllers 808 may be configured to output the template 500 to the fabrication tool 826. For example, the fabrication tool 826 may include a vertical band saw, a sander, or other fabrication tool capable of reducing the stack of lumber to the lumber core based on the template 500. For instance, a user may use the fabrication tool 826 to cut the inside block 402/lumbercore from the outside block 410/stack of lumber. In addition, the fabrication tool 826 may be configured to automatically cut the inside block 402/lumbercore from the outside block 410/stack of lumber.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for forming a lumbercore from a plurality of sheets of veneer, the plurality of sheets of veneer producing an artificial grain pattern within the lumbercore, comprising:
   receiving a veneer grain width input, a veneer thickness input, a lumbercore width input and a lumbercore height input;
   forming a stack of lumber from the plurality of sheets of veneer comprising;
      sequencing the plurality of sheets of veneer based on at least one of the veneer grain width input, the veneer thickness input, the lumbercore width input, or the lumbercore height input; and
      applying an adhesive between adjacent sheets of the plurality of sheets of veneer;
   generating at least one of a physical template or a digital template, wherein the at least one of the physical template or the digital template maps the lumbercore to the stack of lumber, the at least one of the physical template or the digital template being based on the lumbercore width input, the lumbercore height input, and the set of dimensions for the stack of lumber, the at least one of the physical template or the digital template including the cut angle;

applying the at least one of the physical template or the digital template to the stack of lumber, and cutting the lumbercore from the stack of lumber at the cut angle included in the at least one of the physical template or the digital template.

2. The method of claim 1, wherein the veneer grain width is maintained through sequential parallel cuts through the entirety of the lumbercore.

3. The method of claim 1, the set of dimensions for the stack of lumber including a stack width, a stack height, and a number of sheets of veneer for the plurality of sheets of veneer, the plurality of sheets of veneer each having a select thickness.

4. The method of claim 3, further comprising obtaining a reference sheet of veneer, the select thickness of a sheet of veneer within the plurality of sheets of veneer being approximately equal to a thickness of a veneer grain width within the reference sheet of veneer.

5. The method of claim 3, the dimensions of the lumbercore being defined within the set of dimensions of the stack of lumber, with the lumbercore width input being less than the stack width of the stack of lumber and the lumbercore height input being less than the stack height of the stack of lumber.

6. The method of claim 1, the adhesive comprising a clear epoxy resin.

7. The method of claim 1, the forming the stack of lumber from the plurality of sheets of veneer further comprising:

firetreating the plurality of sheets of veneer prior to applying the adhesive between the adjacent sheets of the plurality of sheets of veneer.

8. The method of claim 1, the physical template being applied to an end surface of the stack of lumber.

9. The method of claim 1, the physical template or the digital template further including an inside block representing the lumbercore, the inside block rotated relative to horizontal an amount equal to the cut angle within an outside block, the outside block representing the stack of lumber.

10. The method of claim 9, the lumbercore including a portion of the plurality of sheets of veneer after the lumbercore is cut from the stack of lumber, the portion of the plurality of sheets of veneer being set relative to horizontal at the cut angle through the end surface of the lumbercore.

11. The method of claim 4, the reference sheet of veneer and a top surface of the lumbercore having at least one of a matching color, grain width, or grain pattern.

12. The method of claim 11, the top surface of the lumbercore including a plurality of edges of the portion of the plurality of sheets of veneer, at least one of the matching color, grain width, or grain pattern being visible across the plurality of edges of the plurality of sheets of veneer after the lumbercore is cut from the stack of lumber.

* * * * *